(12) United States Patent
Davis (10) Patent No.: US 8,896,989 B2
(45) Date of Patent: Nov. 25, 2014

(54) SYSTEM FOR PROVIDING POWER AND CONTROL SIGNALS TO DEVICES

(75) Inventor: Adam Davis, Leola, PA (US)

(73) Assignee: Tait Towers Manufacturing, LLC, Lititz, PA (US)

( * ) Notice: Subject to any disclaimer, the term of this patent is extended or adjusted under 35 U.S.C. 154(b) by 275 days.

(21) Appl. No.: 13/349,118

(22) Filed: Jan. 12, 2012

(65) Prior Publication Data

US 2012/0176735 A1 Jul. 12, 2012

Related U.S. Application Data

(60) Provisional application No. 61/431,993, filed on Jan. 12, 2011.

(51) Int. Cl.
*H02B 1/26* (2006.01)
*G09G 3/34* (2006.01)
*H05B 37/02* (2006.01)

(52) U.S. Cl.
CPC .............. *G09G 3/34* (2013.01); *H05B 37/0254* (2013.01)
USPC ........................................................ 361/641

(58) Field of Classification Search
CPC .............. H02B 1/26; H02G 3/08; H02G 15/02
USPC ................................................. 361/622, 641
See application file for complete search history.

(56) References Cited

U.S. PATENT DOCUMENTS

| | | | |
|---|---|---|---|
| 4,392,187 A | 7/1983 | Bornhorst | |
| 4,710,819 A | 12/1987 | Brown | |
| 4,947,302 A | 8/1990 | Callahan | |
| 5,209,560 A | 5/1993 | Taylor et al. | |
| 5,769,527 A | 6/1998 | Taylor et al. | |
| 5,920,476 A | 7/1999 | Hennessey et al. | |
| 6,209,852 B1 | 4/2001 | George et al. | |
| 6,297,610 B1 | 10/2001 | Bauer et al. | |
| 6,459,919 B1 | 10/2002 | Lys et al. | |
| 6,600,289 B2 | 7/2003 | George et al. | |
| 6,873,355 B1 | 3/2005 | Thompson et al. | |
| 6,909,943 B2 | 6/2005 | Lehr et al. | |

(Continued)

FOREIGN PATENT DOCUMENTS

| | | |
|---|---|---|
| JP | 2009159624 A | 7/2009 |
| WO | 2011079115 A1 | 6/2011 |
| WO | 2011079122 A1 | 6/2011 |

OTHER PUBLICATIONS

XLNT Advanced Technologies Manufacturing BV, User Manual, Cyberhoist CH 1000/500/250 EU/US, Jan. 2009, Version 3, 32 pgs.

*Primary Examiner* — Gregory Thompson (57) ABSTRACT

A system for providing power and control to devices is described. The system includes a distribution box having connection points to receive power from a power supply and connection points to receive control instructions from a control system. The distribution box includes a plurality of output connection points to provide power and control instructions to the devices of the system. Each output connection point of the distribution box uses the same configuration of power and control conductors. Each device in the system uses a connection box with a connection point that can have the same configuration of power and control conductors as the distribution box. A plurality of cables are configured to connect the connection point on the connection box to a corresponding output connection point on the distribution box.

26 Claims, 2 Drawing Sheets

(56) References Cited

U.S. PATENT DOCUMENTS

| | | |
|---|---|---|
| 7,080,824 B1 | 7/2006 | George et al. |
| 7,080,825 B1 | 7/2006 | George et al. |
| 7,623,440 B2 * | 11/2009 | Geile et al. .................... 370/204 |
| 7,971,856 B2 | 7/2011 | Kochan |
| 8,214,061 B2 * | 7/2012 | Westrick et al. ................. 700/9 |
| 8,705,258 B2 | 4/2014 | Reese et al. |
| 2004/0000816 A1 | 1/2004 | Khoshnood |
| 2007/0191966 A1 | 8/2007 | Fisher et al. |
| 2007/0281520 A1 * | 12/2007 | Insalaco et al. ............... 439/120 |
| 2008/0302033 A1 * | 12/2008 | Insalaco et al. ............. 52/220.2 |
| 2009/0015426 A1 | 1/2009 | Long et al. |
| 2009/0083805 A1 * | 3/2009 | Sizelove et al. ................. 725/76 |
| 2010/0289668 A1 | 11/2010 | Biester et al. |

* cited by examiner

SYSTEM FOR PROVIDING POWER AND CONTROL SIGNALS TO DEVICES

CROSS-REFERENCE TO RELATED APPLICATIONS

This application claims the benefit of U.S. Provisional Application No. 61/431,993, entitled "SYSTEM FOR CONTROLLING AND POWERING MOTORS USED IN THEATRICAL EVENTS," filed Jan. 12, 2011, which application is hereby incorporated by reference in its entirety.

BACKGROUND

The application generally relates to the providing of power and control signals to devices. The application relates more specifically to a system to provide both power and control signals to a group of devices (e.g., motors and/or other powered components) using modular components that accommodate both power and control signals.

An example of a group of devices (e.g., motors and/or other powered components) that require both power and control signals are the devices associated with a live performance or event, e.g., a sporting event, a concert or a theatrical/religious performance, or a movie or television production. Some examples of the devices that can be used with the live performance or movie or television production include lifts, chain hoists, winches, elevators, carousels, turntables, trolleys, multi-axis systems, linear motion systems (e.g., deck tracks and line sets), audio devices, lighting devices, and/or video devices. In addition, some devices used with the live performance or movie or television production can be a combination of multiple types of devices. For example, a trolley can be combined with one or more winches that can be operated while the trolley is in motion.

To properly operate the devices used for the live performance or movie or television production, both power and control signals must be provided to each device. In many arrangements, the power to the devices can be provided from a power grid(s) at the location of the performance or production and the control signals for the devices can be provided from an automation and motion control system. The automation and motion control system can control the devices to operate corresponding motors to raise or lower barriers, curtains or other objects, rotate an object or move an object along a predefined path.

To provide the power and control to the devices, each device can be individually wired from both the corresponding power grid and the automation and motion control system. Having to wire both the power and control for each individual device can be very time consuming and labor intensive. In addition, depending on the type of power and/or control signal used, an electrician may be required to complete the power and control connections at the device. Furthermore, the individual wiring of power and control cables or wires to each device does not provide for portability of the device, such as would be needed in a travelling event, since assembly and disassembly of the device is time consuming and labor intensive, as previously mentioned.

To alleviate some of the problems with wiring each device individually from the power grid and the automation and motion control system, devices that are located in close proximity to one another can be networked or connected to one another and use the same power and control signals. Some examples of networks or connections that can be used include star arrangements, daisy chain arrangements, ring arrangements, mesh arrangements, daisy chain loop arrangements, token ring arrangements, token star arrangements or combinations thereof.

For example, in a daisy chain arrangement, the power and control signals can be provided to the first device in the "chain" and then from that first device, the power and control signals are provided or jumpered from device to device until the "chain" is complete. If the devices in the "chain" are mounted on a structure that can be transported, there is usually no need to unwire the entire "chain," only the power and control connections at the first device. Once the disconnection of the power and control connections at the first device is complete, the remaining structure, devices and corresponding wiring can be transported as a package. While the use of a daisy chain arrangement does simplify the assembly and disassembly of the power and control connections in a performance or production, the power and control connections between the devices in the "chain" must still be individually wired by an electrician and the electrician is still required to complete the power and control wiring at the first device each time the structure is assembled or disassembled.

In another arrangement, an intermediate device in communication with both the power grid and the automation and motion control system can be used to provide power and control signals to one or more networks of devices and/or individual devices. The intermediate device, sometimes referred to as a drive rack or stack, can be positioned in a location that is in close proximity to the devices, whether networked or individual, to shorten the length of the separate power and control cables that would be required by the devices. In addition, the intermediate device may include one or more controllers that can generate control instructions for the devices based on inputs received from the automation and motion control system. One problem with the use of an intermediate device is that individual power and control cables or wires still must be connected to each device. Another problem with the intermediate device is that assembly and disassembly of the intermediate device requires an electrician to handle the wiring connections both at the intermediate device and at the corresponding devices.

Therefore, what is needed is a system that enables the quick and easy assembly and disassembly of power and control connections for a group of devices.

SUMMARY

The present application is directed to a system to provide power and control signals to a plurality of devices. The system includes a distribution box, a plurality of cables, and a plurality of connection boxes. The distribution box includes at least one input interface connectable to at least one of a power supply or an automation and motion control system and a plurality of output interfaces connected to the at least one input interface. Each output interface of the plurality of output interfaces has a plurality of connection points arranged in a preselected configuration. The plurality of connection points includes at least one first connection point to provide control signals and at least one second connection point to provide power signals. Each cable of the plurality of cables includes at least one first conductor to transmit control signals and at least one second conductor to transmit power signals. Each cable of the plurality of cables has a first connector positioned at one end of the cable and a second connector positioned at an opposite end of the cable. The first connector is configured to connect to the plurality of connection points in the output interface. Each connection box of the plurality of connection boxes includes a cable interface and a component interface in communication with the cable interface. The cable interface is configured to connect to a second connector of the cable and the component interface is configured to connect to a device.

The present application is also directed to a distribution box having a first interface, a second interface and a plurality of third interfaces connected to both the first interface and the second interface. The first interface is operable to receive power from a connected power supply. The second interface is operable to receive control signals from a connected control system. Each third interface of the plurality of third interfaces includes a connection point to distribute power and control signals to a device connected to the third interface. The connection point includes one or more power connection points and one or more control connection points arranged in a predetermined configuration.

The present application is further directed to a connection box for a device requiring both power and control signals. The connection box includes a first interface, a power control device, a control board and a second interface connected to the power control device and the control board. The first interface includes a connection point to receive power and control signals from a cable connected to the first interface. The connection point includes one or more power connection points and one or more control connection points arranged in a predetermined configuration. The power control device is connected to the first interface to receive power signals from the first interface. The control board is connected to the first interface to receive control signals from the first interface. The second interface is operable to supply power and control signals to a device connected to the second interface.

The present application is also directed to a cable to interconnect devices associated with a live performance. The cable includes at least one power conductor to supply power for a device and a fiber optic cable to provide control signals for the device. The cable also includes electromagnetic radiation shielding positioned to isolate the at least one power conductor and the fiber optic cable, a first connector and a second connector. The first connector includes at least one first connection point connected to the at least one power conductor and at least one second connection point connected to the fiber optic cable. The second connector is positioned opposite the first connector and includes at least one first connection point connected to the at least one power conductor and at least one second connection point connected to the fiber optic cable.

One embodiment of the present application includes a system for providing power and control to motors used in a theatrical event. The system includes a distribution box having connection points to receive power from a power supply and connection points to receive control instructions from a control system. The distribution box includes a plurality of output connection points to provide power and control instructions to the components used in the theatrical event. Each output connection point has the same configuration of power and control conductors. The system also includes a plurality of motors to power the components used in the theatrical event. The plurality of motors are connectable to the output connection points of the distribution box by a plurality of cables. Each motor of the plurality of motors has a motor box with a motor box connection point that is substantially identical to the configuration of the output connection points of the distribution box. The plurality of cables are configured to connect the motor box connection point to a corresponding output connection point of the plurality of output connection points on the distribution box.

One advantage of the present application is that only one cable type is needed for wiring similar devices into the system.

Another advantage of the present application is that control commands can be processed at the device thereby eliminating the need for a central processor to process the control commands for the device.

A further advantage of the present application is that the cable used for wiring between the distribution box and the connection box has simple connectors and does not require the use of an electrician.

Still another advantage of the present application is that the system components, e.g., cable, distribution box, connection box, and corresponding interfaces, are modular and can be quickly replaced in response to malfunctions or design changes.

Other features and advantages of the present application will be apparent from the following more detailed description of the preferred embodiment(s), taken in conjunction with the accompanying drawings which illustrate, by way of example, the principles of the application.

DETAILED DESCRIPTION OF THE EXEMPLARY EMBODIMENTS

Figure 1:
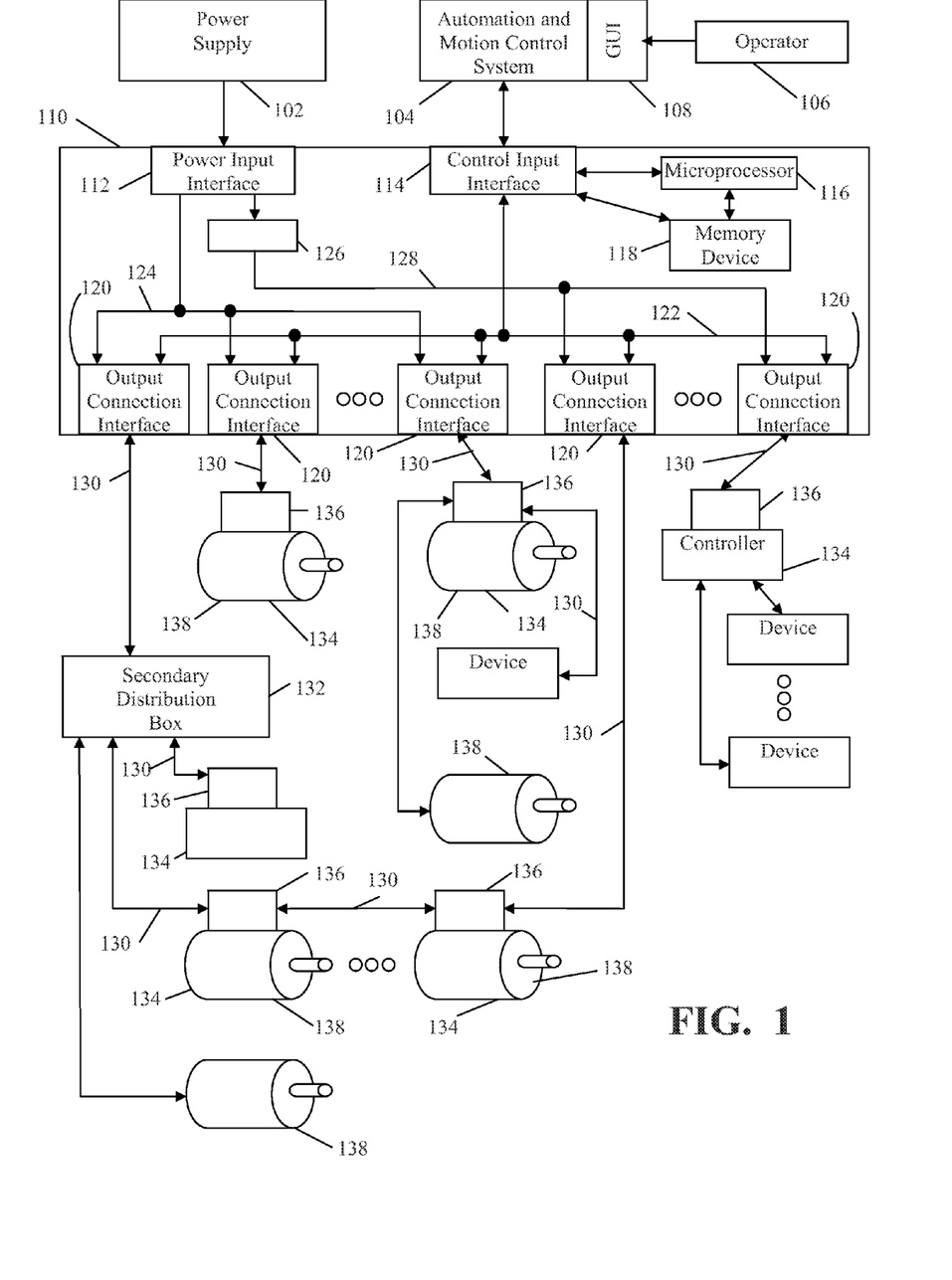
FIG. 1 schematically shows a system for providing power and control signals to multiple devices.

FIG. 1 shows an embodiment of a system that provides power and control signals to powered devices, such as the powered devices associated with a live performance or television or movie production. The powered devices can include components or equipment such as lifts, chain hoists, winches, elevators, carousels, turntables, trolleys, multi-axis systems, pumps (e.g., hydraulic, pneumatic and water), linear motion systems (e.g., deck tracks and line sets), audio devices, lighting devices (e.g., LED light, moving light and theatrical light), and/or video devices (e.g., video screen). To operate the components or equipment used in the system, the powered devices can receive power signals and control signals. The power signals can provide the energy, i.e., the voltage and current, necessary to operate the powered device. The control signals instruct the powered device on how to operate, e.g., when to start, when to stop, and for powered devices with motors, what speed to rotate the motor, or which direction to rotate the motor, i.e., clockwise or counterclockwise. The control signals received by the powered device can be generated by an automation and motion control system executing one or more preselected control algorithms. In another exemplary embodiment, the powered devices can include controllers or other similar devices that are used to control the operation of other components or equipment used by the system such as valves in hydraulic or pneumatic systems, limit switches, cutoff switches and external input/output devices.

The system can include a power supply or power grid 102 to provide the necessary power to the equipment. The power supply 102 can supply a single phase or three-phase AC voltage or line voltage of between about 110 V to about 600 V, such as 110 V, 115 V, 120 V, 187 V, 208 V, 220 V, 230 V, 380 V, 415 V, 460 V, 575 V, or 600 V, at a line frequency of 50 Hz or 60 Hz. Depending on the type of voltages (and currents)

required by the equipment, several power supplies 102 may be used to provide different voltage levels for the equipment, with each power supply 102 providing a different voltage level.

The system can also include an automation and motion control system 104 to provide control instructions to the devices or equipment. The control system 104 can execute one or more control algorithms to provide control instructions to the devices. In addition to the control instructions generated from the execution of the control algorithms, additional control instructions can be generated in response to an instruction from an operator 106. The operator 106 can provide instructions to and/or interact with the control system 104 through the use of a graphical user interface (GUI), human-machine interface (HMI) 108 or other suitable input device. The control system 104 can communicate with the devices using a suitable communication protocol such as 0-10 V (volt), Modbus, Profibus, Artnet, BMS, Ether Cat, DMX, SMPTE, MIDI, Ma-Net, K-Bus, Serial, Ethernet, TCP/IP, UDP, ControlNet, DeviceNet, RS232, RS 45, CANbus, Maya and/or Lightwave.

A primary distribution box 110 can be used for the distribution of the power signals from the power supply 102 and the distribution of control signals from the control system 104 to the corresponding devices of the system. The primary distribution box 110 can include a power input interface 112 to receive the power signals from the power supply 102 and a control input interface 114 to receive the control signals from the control system 104. In one exemplary embodiment, both the power input interface 112 and the control input interface 114 can be modular components that can be inserted in the distribution box 110. In another exemplary embodiment, the power input interface 112 and the control input interface 114 can be combined into a single input interface for power and control signals.

The power signals provided to the power input interface 112 from the power supply 102 can provide the appropriate amount of power, i.e., the voltage and current, required for the full load demand of all of the powered devices to be supplied from the primary distribution box 110. In one embodiment, the primary distribution box 110 can be rated for up to 400 amperes (A) of current. In other embodiments, the primary distribution box can be rated for currents of 60 A, 150 A or 200 A depending on the number of devices to be powered. In another embodiment, the primary distribution box 110 can have multiple power input interfaces 112 that can be connected to power supplies 102 of different voltage levels. In a further embodiment, several primary distribution boxes can be connected in parallel to a power supply 102 depending on the corresponding load of the powered devices in the system.

The control signals provided to control the input interface 114 from the control system 104 can provide the appropriate control instructions to control all of the powered devices connected to the primary distribution box 110. In addition, control instructions, data, and/or information can be provided to the control system 104 from the powered devices through the control input interface 114 of the primary distribution box 110. The primary distribution box 110 can also optionally include a microprocessor 116 and a memory device 118 connected to the control input interface 114 to assist with the processing and handling of instructions, information and data being exchanged between the powered devices and the control system 104. In another exemplary embodiment, the control system 104 can provide the appropriate control instructions to any components or equipment powered and/or controlled from a powered device.

To provide the power and control signals to the powered devices, the primary distribution box 110 can have a plurality of output connection interfaces 120 that combine the power signals from the power input interface 112 and the control signals from the control input interface 114. The maximum number of output connection interfaces 120 on the primary distribution box 110 can correspond to the maximum number of powered devices that can be powered from the intended power supply 102 to be connected to the power input interface 112 or the number of output connection interfaces 120 can be based on other design criteria, e.g., space considerations.

The output connection interface 120 provides a uniform connection point, i.e., the location of the power connection points and the control connection points are identical for each output connection interface 120, for a powered device to connect to receive both power and control signals. In one embodiment, common power and control signals are provided to each output connection interface 120 from the power input interface 112 and the control input interface 114, thereby enabling any powered device requiring the provided power and control signals to be connected to any available output connection interface 120. In an exemplary embodiment, each output connection interface 120 can have an identical internal configuration or arrangement for converting or transferring the power and control signals from the power input interface 112 and the control input interface 114 to the uniform connection point. In another exemplary embodiment, the uniform connection point can be configured to have all the power terminals on connection points in one area and all the control terminals or connection points in a different area.

In another embodiment, different power and/or control signals from other power input interfaces 112 or control input interfaces 114 can be provided to the output connection interfaces 120, thereby enabling powered devices having different power and/or control signal requirements to be connected to the primary distribution box 110. In this embodiment, the output connection interfaces 120 may use different internal configurations or arrangements for converting or transferring the power and control signals from the other power input interfaces 112 and the other control input interfaces 114 to the uniform connection point depending on the particular power and/or controls signals being provided to the output connection interface 120. In addition, when different power and/or control signals are provided to the output connection interfaces 120, the output connection interfaces 120 can be arranged in groups providing the same power and control signals and can be identified on the primary distribution box 110 as providing a particular set of power and control signals.

FIG. 1 shows an exemplary embodiment of providing different power signals to the output connection interfaces 120. In FIG. 1, the power input interface 112 is connected to a first power bus 124 and provides power signals to a first group of output connection interfaces 120. The power input interface 112 also has an output connected to a power conversion device 126, such as a transformer, whose output is connected to a second power bus 128 and provides power signals to a second group of output connection interfaces 120. In one exemplary embodiment, the first power bus 124 can be used to distribute the power from the power supply 102 and the power conversion device 126 connected to the second power bus 128 can be a "step-down" transformer such that the second power bus 128 can be used to distribute power at a level lower than the power provided by the power supply 102. The control input interface 114 is connected to a control bus 122 that is connected to each of the output connection interfaces 120 to enable common control signals to be provided to each output connection interface 120. In another exemplary embodiment, multiple power conversion devices 126 can be connected to the power input interface 112 to provide multiple power levels. In still another embodiment, the power conversion device 126 can be replaced by an AC to DC converter to provide a DC power level to the output connection interfaces 120.

In an exemplary embodiment, the uniform connection point of the output connection interface 120 is configured to connect to a connector from a system cable 130 that can carry both the power and control signals. The system cable 130 can include both the power cables, conductors or wires with the power for the powered device and the control cables, conductors or wires with the control instructions or signals, data or information for the powered device, while maintaining the separation or isolation of the power conductors and the control conductors.

Figure 2:
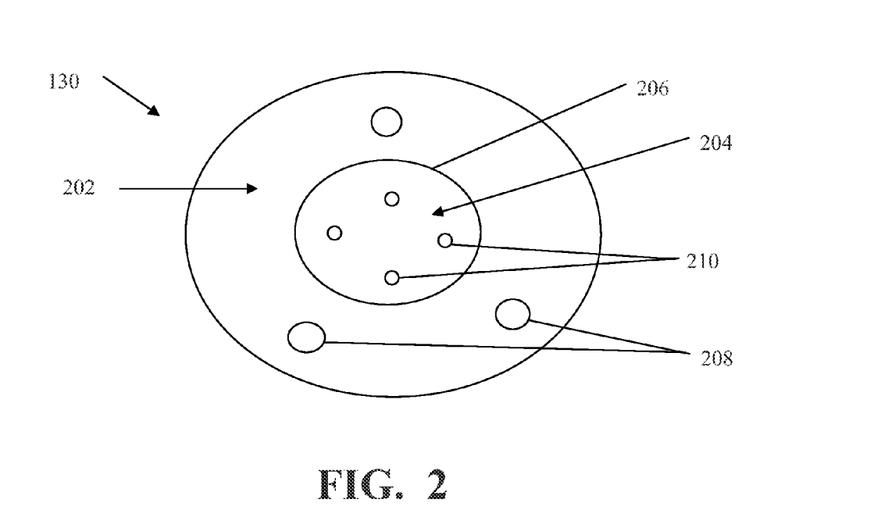
FIG. 2 schematically shows a cross-section of an embodiment of a cable used with the system of FIG. 1.

FIG. 2 shows schematically a cross-section of an embodiment of a system cable. The system cable 130 has a power conductor area 202 surrounding a control conductor area 204. The power conductor area 202 is separated from the control conductor area 204 by appropriate shielding 206 designed to minimize the amount of electromagnetic interference caused by the power conductors 208 in the power conductor area 202 or from motors or other devices. The power conductor area 202 can be configured to have the appropriate number of conductors 208 necessary to provide the corresponding power to the powered devices. Similarly, the control conductor area 204 can have an appropriate number of conductors 210 to provide control instructions or operations, e.g., motor control instructions, emergency stop (estop) instructions and data transfer operations, to the powered devices. In one exemplary embodiment, the control conductors 210 can be individually shielded and use twisted pairs or other similar types of wiring configurations. In another exemplary embodiment, the control conductor area 204 can have a fiber optic cable in place of the control conductors 210. In the embodiment of FIG. 2, there are four control conductors 210 and three power conductors 208. However, in other embodiments, the system cable 130 can have more or less than four control conductors 210 and more or less than three power conductors 208.

In another embodiment, the power conductor area 202 can be surrounded by one or more control conductor areas 204 and separated by the appropriate shielding 206. In still another embodiment, the power conductors 208 and the control conductors 210 can be handled as individual cables and placed within system cable 130. In other words, each power conductor 208 and control conductor 210 can have its own insulation and shielding before being assembled into system cable 130.

In one exemplary embodiment, not all of the power conductors 208 and/or the control conductors 210 in the system cable 130 may be used to transmit power and control signals depending on the power and control signals provided to the uniform connection point of the output connection interface 120 to which the system cable 130 is connected. In other words, the uniform connection point of the output connection interface 120 may have one or more inactive or disabled connection points or terminals that do not provide a power signal or a control signal. The system cable 130 can be designed to have sufficient power conductors 208 and control conductors 210 to connect to all of the power and control connection points or terminals of the uniform connection point of the output connection interface 120 regardless of whether all of the power and control connection points or terminals have active power signals or control signals present.

In an exemplary embodiment, each end of the system cable 130 can have a connector configured to mate with the connection points or terminals of the uniform connection point of the output connection interface 120. The specific configuration of the system cable connector is dependent on the configuration of the connection points or terminals used for the uniform connection point and can include male connectors, female connectors or a combination of male and female connectors. By using the same system cable connector at each end of the system cable 130, the system cable 130 does not have to be oriented before being used. After the one end of the system cable 130 is connected to an output connection interface 120, the other end of the system cable 130 is connected to a uniform connection point associated with the corresponding powered device that has the same configuration of connection points or terminals. The use of a common connector at each end of the system cable 130 that mates with uniform connection points on the powered device or the output connection interface 120 enables the wiring of powered devices and/or secondary distribution boxes by the simple plugging and unplugging of the system cable 130. Further, the standard configuration of the system cable 130 enables the simple replacement of a damaged or defective system cable 130 because each cable has the same configuration.

Referring back to FIG. 1, some or all of the output connection interfaces 120 of the primary distribution box 110 can be connected to either a secondary distribution box 132 or a powered device 134 using system cables 130. Each powered device 134 can have a connection box 136 to receive the power and control signals from the primary distribution box 110.

The secondary distribution box 132 can have an input interface to receive a system cable 130 from the primary distribution box 110 with either the same connection point configuration as the output connection interface 120, i.e., the uniform connection point, or a different connection point configuration depending on the connector used at the end of the cable 130. In addition, the secondary distribution box can include multiple output connection interfaces 120 with uniform connection points to permit other power devices 134 (with connection boxes 136) or secondary distribution boxes 132 to be connected using system cables 130. The secondary distribution box 132 can also include different output interfaces to connect motors 138 or other electrical devices that do not have (or need) a connection box 136. In one embodiment, the secondary distribution box 132 can have a rating (current or voltage) less than the primary distribution box 110. In addition, the secondary distribution box 132 may be internally configured similar to the primary distribution box 110 for the distribution of power and control signals to the output interfaces of the secondary distribution box 132.

The secondary distribution box 132 can be used in an area where multiple powered devices 134 are located at a distance from the primary distribution box 110 or in situations where the number of powered devices 134 to be powered from the power supply 102 exceeds the number of output connection interfaces 120 on the primary distribution box 110. In one embodiment, the secondary distribution box 132 can incorporate repeaters and/or amplifiers or other similar equipment to facilitate the transfer of the control instructions between the powered devices 134 and the control system 104. In another embodiment, the secondary distribution box 132 can include some processing capabilities to generate control instructions for motors 138 or other electrical devices that do not use the connection box 136. In still another embodiment, an adapter can be used with the input interface of the secondary distribution box 132 to enable the secondary distribution box to receive power signals directly from the power supply 102 and to receive control signals directly from the automation and motion control system 104. In other words, the adapter can be used to convert a secondary distribution box 132 into a primary distribution box 110.

Figure 3:
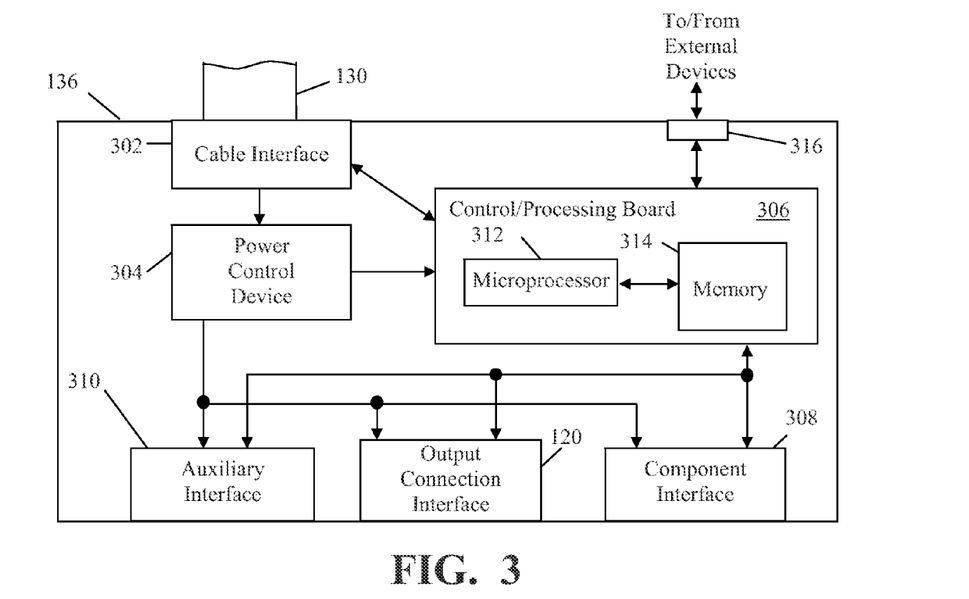
FIG. 3 schematically shows an embodiment of a connection box used with the system of FIG. 1.

FIG. 3 shows schematically an embodiment of a connection box. The connection box 136 can have a cable interface 302 to receive the system cable 130 from either the primary distribution box 110 or the secondary distribution box 132. The cable interface 302 can have either the same connection point configuration as the output connection interface 120, i.e., the uniform connection point, or can have a different connection point configuration depending on the connector used at the end of the cable 130. The cable interface 302 separates the power signals from the control signals provided by the cable 130. After separating the power signals from the control signals, the cable interface 302 provides the power signals to a power control device 304 and provides the control signals to a control/processing board 306. In an exemplary embodiment, the cable interface 302 can be used as the input interface to the secondary distribution box 132.

The power control device 304 and the control/processing board 306 can each be connected to one or more of a component interface 308, an output connection interface 120 and an auxiliary interface 310. The component interface 308 can be used to facilitate the transfer of power and control signals between the component, e.g., a motor, and the power control device 304 and the control/processing board 306. In one embodiment, the component interface 308 can provide for a mated connection with the component. While in another embodiment, the component interface 308 can provide wiring terminals for a wired connection to terminals on the component. The use of the component interface 308 in the connection box 136 permits the easy substitution of either the component or the connection box 136 as may be required by the prevailing conditions or circumstances, e.g., the component may be defective or not appropriate for the desired application or the connection box 136 may be defective or not include the appropriate control algorithm for the component.

The output connection interface 120 can be used to connect an additional powered device 134 into the system using cable 130. In another embodiment, the output connection interface 120 of connection box 136 can be connected to an output connection interface 120 of the distribution box 110 by cable 130 to provide a redundant supply of power and control to one or more powered devices 134 that are connected together. The auxiliary interface 310 can be used to provide power to other devices, e.g., motors, that only require basic control operations, e.g., on or off commands. The control/processing board 306 can provide the basic control operations to the auxiliary interface 310 to control the supply of power from the power control device 304 to the other device. In another exemplary embodiment, the connection box 136 may not have an auxiliary interface 310 and the output connection interface 120 can be used (with cable 130) to provide power and/or control to a device (so long as the device has a cable interface 302 to receive cable 130).

In addition to providing power to the auxiliary interface 310 and the component interface 308, the power control device 304 can provide power to the control/processing board 306 (and any associated control board components). In one embodiment, the power control device 304 can include one or more transformers to provide different voltage levels and/or one or more AC-to-DC converters to provide DC power.

The control/processing board 306 can include one or more microprocessors 312 and one or more memory devices 314 that store information, data and/or control algorithms or programs. The control algorithms stored in the memory device 314, when executed by the microprocessor 312, can be used to process the control instructions received from the automation and motion control system 104 and generate the appropriate control commands for the powered device 134. The processing of the control instructions from the automation and motion control system 104 at the connection box 136 instead of at the automation and motion control system 104 provides for the decentralized processing of control instructions. The decentralized processing of control instructions can increase overall system reliability since the failure of one control/processing board 306 can affect only one powered device and/or a limited number of devices or components that are connected to the corresponding connection box 136. Further, depending on the particular control algorithms executed by the control/processing board 306, multiple connection boxes 136 could be used for the distributed processing of particular control instructions from the automation and motion control system 104. In addition, the control algorithm stored in the control/processing board 306 can be used to exchange, i.e., send and receive, data, signals, instructions and/or information with the automation and motion control system 104 and/or the other control/processing boards 306 of the other powered devices 134. In another embodiment, the control/processing board 306 can incorporate repeaters and/or amplifiers or other similar equipment to facilitate the transfer of the control instructions between the powered devices 134.

The connection box 136 can include one or more connection points 316 providing input and/or output connections for external devices, such as portable memory devices (e.g., memory cards or flash drives) or operator interfaces (e.g., joystick, keyboard, mouse or monitor). In one exemplary embodiment, a portable memory device can be connected to the control/processing board 306 to provide a control program or algorithm for execution by the microprocessor 312 different from the one stored in the memory device 314. The new control program or algorithm may be required in response to a new location for the powered device 134 that requires different commands to be generated corresponding to the new location of the powered device 134 or in response to a change to the desired actions to be performed by the powered device 134. The new control program or algorithm can be loaded or stored in the memory device 314 of the control/processing board 306 for execution by the microprocessor 312 or the new control program or algorithm can be executed directly from the portable memory device.

In one exemplary embodiment, the microprocessor(s) 312 of the control/processing board 306 can execute one or more control programs or algorithms stored in the memory device(s) 314 associated with the powered device 134. The control program or algorithm executed by the control/processing board 306 can provide the necessary control instructions to control operation of the components of the powered device 134. For example, if the powered device 134 is a winch, the control/processing board 306 can provide instructions or commands to extend or retract cable, to control the speed at which the cable is extended or retracted, to turn on outputs, to send analog signals, to monitor incoming signals or inputs and/or to trigger audio commands. In addition, the control/processing board 306 can receive signals, instructions and/or information from the automation and motion control system 104 and/or the other control/processing boards 306 of the other connection boxes 136 and can then generate the appropriate response instructions or commands for the powered device 134 based on the received input. By having information on the operation of the other powered devices 134, the control/processing board 306 can generate the appropriate instructions or commands for the powered device 134 to provide for smooth operation of the system.

In yet another exemplary embodiment, the control algorithm(s) stored in the powered device 134 can be executed in response to receiving a particular command or signal from the automation or motion control system 104. A command or signal from the automation or motion control system 104 could trigger the execution of a control algorithm in the powered device 134 that would result in several individual actions being taken by the powered device 134. For example, a sequence of actions taken by the powered device 134 in response to a signal from the automation or motion control system 104 could be to coordinate with other control/processing boards 306, deploy/retract cable and stop deploying/retracting cable after a predetermined time period, if the powered device 134 was a winch.

In another embodiment, the control/processing board 306 can be removed and substituted with a different control/processing board 306 that includes different control algorithms to provide different functionality to the powered device 134. Similarly, a defective control/processing board 306 can be quickly replaced without having to replace the connection box 136.

In an exemplary embodiment of the present application, the microprocessor 116 and memory device 118 can be used to execute the automation and motion control system internally. The microprocessor 116 can be connected to the control bus 122 to distribute the control signals generated from executing the automation and motion control system. If the automation and motion control system is executed internally to the primary distribution box 110, the control input interface 114 is no longer required (since the automation and motion control system 104 is not required) and can be replaced with a different interface. In one embodiment, the control input interface 114 can be replaced with an interface to connect to the graphical user interface 108.

In another exemplary embodiment, the automation and motion control system can use distributed processing techniques. In this embodiment, the automation and motion control system 104 can be configured to connect to an output connection interface 120 and the control input interface 114 can be removed. The microprocessor 116 can be connected to the control bus 122 to assist, as necessary, with the transfer of control signals and data between the automation and motion control system 104 and the powered devices 134 along the control bus 122.

In an exemplary embodiment, the system cable 130 can have different connectors at each end. The connector at one end of the system cable 130 can be configured to connect to the output connection interface 120 of the primary distribution box 110 and the connector at the other end of the system cable 130 can be configured to connect to the cable interface 302 of the connection box 136.

In an exemplary embodiment, many of the powered devices 134 in the system can be motorized components using motors such as induction motors, permanent magnet motors, switched reluctance motors or other suitable motor types. In addition, the automation and motion control system 104 may include other components such as servers, routers, digital to analog (D/A) converters and analog to digital (A/D) converters.

In an exemplary embodiment, the output connection interfaces 120 can be modular components that connect to the separate power and control buses and can provide for easy replacement if a fault should occur in the output connection interface 120. In addition, the use of the modular output connection interface 120 can provide for the substitution of a different module to accommodate a particular situation in the overall system. For example, an output connection interface 120 could be incorporated that includes processing capabilities to provide a connection to a motor that may not include a connection box 136.

While the exemplary embodiments illustrated in the figures and described herein are presently preferred, it should be understood that these embodiments are offered by way of example only. Other substitutions, modifications, changes and omissions may be made in the design, operating conditions and arrangement of the exemplary embodiments without departing from the scope of the present application. Accordingly, the present application is not limited to a particular embodiment, but extends to various modifications that nevertheless fall within the scope of the appended claims. It should also be understood that the phraseology and terminology employed herein is for the purpose of description only and should not be regarded as limiting.

It is important to note that the construction and arrangement of the present application as shown in the various exemplary embodiments is illustrative only. Only certain features and embodiments of the invention have been shown and described in the application and many modifications and changes may occur to those skilled in the art (e.g., variations in sizes, dimensions, structures, shapes and proportions of the various elements, values of parameters (e.g., temperatures, pressures, etc.), mounting arrangements, use of materials, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. It is, therefore, to be understood that the appended claims are intended to cover all such modifications and changes as fall within the true spirit of the invention. Furthermore, in an effort to provide a concise description of the exemplary embodiments, all features of an actual implementation may not have been described (i.e., those unrelated to the presently contemplated best mode of carrying out the invention, or those unrelated to enabling the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

What is claimed is:

1. A system to provide power and control signals to a plurality of devices, the system comprising:
   a distribution box comprising:
      at least one input interface connectable to at least one of a power supply or an automation and motion control system; and
      a plurality of output interfaces connected to the at least one input interface, each output interface of the plurality of output interfaces having a plurality of connection points arranged in a preselected configuration, the plurality of connection points comprising at least one first connection point to provide control signals and at least one second connection point to provide power signals;

a plurality of cables, each cable of the plurality of cables comprising at least one first conductor to transmit control signals and at least one second conductor to transmit power signals, each cable of the plurality of cables having a first connector positioned at one end of the cable and a second connector positioned at an opposite end of the cable, the first connector being configured to connect to the plurality of connection points in the output interface;

a plurality of connection boxes, each connection box of the plurality of connection boxes comprising:
  a cable interface, the cable interface being configured to connect to the second connector of the cable; and
  a component interface in communication with the cable interface, the component interface being configured to connect to a device.

2. The system of claim 1 wherein the distribution box comprises:
  at least one power bus to distribute power signals, the at least one power bus being connected to the plurality of output interfaces; and
  at least one control bus to distribute control signals, the at least one control bus being connected to the plurality of output interfaces.

3. The system of claim 2 wherein the at least one input interface comprises a power input interface connectable to the power supply, the power input interface being connected to the at least one power bus.

4. The system of claim 3 wherein:
  the distribution box further comprises a power conversion device connected to the power input interface;
  the at least one power bus comprises a first power bus connected to a first set of output interfaces of the plurality of output interfaces and a second power bus connected to a second set of output interfaces of the plurality of output interfaces;
  the first power bus being directly connected to the power input interface to provide power directly from the power supply to the first set of output interfaces; and
  the second power bus being directly connected to the power conversion device to provide converted power from the power conversion device to the second set of output interfaces.

5. The system of claim 2 wherein the at least one input interface comprises a control input interface connectable to the automation and motion control system, the control input interface being connected to the at least one control bus.

6. The system of claim 2 wherein the distribution box comprises a microprocessor and a memory device, the memory device storing a control algorithm executable by the microprocessor to generate control signals and the microprocessor being connected to the at least one control bus to distribute the generated control signals.

7. The system of claim 2 wherein the automation and control system is connected to an output interface of the plurality of output interfaces.

8. The system of claim 1 further comprising a secondary distribution box, the secondary distribution box being connected to the distribution box by a cable of the plurality of cables, the secondary distribution box comprising a second plurality of output interfaces, each output interface of the second plurality of output interfaces having the plurality of connection points arranged in the preselected configuration.

9. The system of claim 8 wherein the secondary distribution box comprises at least one second output interface to connect to a device.

10. The system of claim 1 wherein:
  each connection box of the plurality of connection boxes is interchangeable with another connection box of the plurality of connection boxes; and
  each cable of the plurality of cables is interchangeable with another cable of the plurality of cables.

11. The system of claim 1 wherein each output interface of the plurality of output interfaces and the first connector, when connected, are operable to exchange control signals between the at least one first conductor and the at least one first connection point and are operable to exchange power signals between the at least one second conductor and the at least one second connection point.

12. The system of claim 1 wherein the first connector and the second connector are identical.

13. The system of claim 1 wherein each connection box of the plurality of connection boxes comprises:
  a power control device connected to the cable interface to receive power signals from the cable interface;
  a control board connected to the cable interface to receive control signals from the cable interface, the control board comprises a microprocessor and a memory device; and
  the power control device and the control board each being connected to the component interface to provide power and control signals to the device.

14. The system of claim 1 wherein each connection box of the plurality of connection boxes comprises an auxiliary interface to connect to a second device, the auxiliary interface is connected to the power control device and the control board.

15. A distribution box comprising:
  a first interface, the first interface being operable to receive power from a connected power supply;
  a second interface, the second interface being operable to receive control signals from a connected control system;
  a plurality of third interfaces connected to both the first interface and the second interface; and
  each third interface of the plurality of third interfaces comprising a connection point to distribute power and control signals to a device connected to the third interface, the connection point comprising one or more power connection points and one or more control connection points arranged in a predetermined configuration.

16. The distribution box of claim 15 further comprising a microprocessor and a memory device in communication with the second interface.

17. The distribution box of claim 15 further comprising:
  a power bus interconnecting the first interface and the plurality of third interfaces; and
  a control bus interconnecting the second interface and the plurality of third interfaces.

18. The distribution box of claim 17 further comprising:
  a power conversion device connected to the first interface, the power conversion device being operable to convert the power from the power supply to a different power;
  a second power bus connected to the power conversion device and separate from the power bus; and
  a plurality of fourth interfaces connected to the second power bus and the control bus, each fourth interface of the plurality of fourth interfaces comprising the connection point to distribute power and control signals to a connected device.

19. The distribution box of claim 18 wherein the power conversion device comprises one of a transformer or an AC to DC converter.

20. The distribution box of claim 18 wherein the one or more power connection points are a plurality of power connection points, the one or more control connection points are a plurality of control connection points, and at least one power connection point of the plurality of power connection points or at least one control connection point of the plurality of control connection points is inactive in the fourth interface.

21. A connection box for a device requiring both power and control signals, the connection box comprising:
- a first interface, the first interface comprising a connection point to receive power and control signals from a cable connected to the first interface, the connection point comprising one or more power connection points and one or more control connection points arranged in a predetermined configuration;
- a power control device, the power control device being connected to the first interface to receive power signals from the first interface;
- a control board, the control board being connected to the first interface to receive control signals from the first interface; and
- a second interface connected to the power control device and the control board, the second interface being operable to supply power and control signals to a device connected to the second interface.

22. The connection box of claim 21 wherein the control board comprises a microprocessor and a memory device, the memory device storing a computer program executable by the microprocessor to generate a plurality of commands to control operation of the device connected to the second interface.

23. The connection box of claim 22 further comprises a connection point to receive a portable memory device.

24. The connection box of claim 23 wherein the portable memory device comprises a second computer program executable by the microprocessor to generate a second plurality of commands to control operation of the device connected to the second interface.

25. The connection box of claim 23 wherein the portable memory device comprises at least one of a flash drive or a memory card.

26. The connection box of claim 21 further comprising:
- a third interface connected to the power control device and the control board; and
- the third interface being operable to supply power to a device connected to the third interface in response to control signals from the control board.

* * * * *